(12) United States Patent
Takiya et al.

(10) Patent No.: US 10,449,875 B2
(45) Date of Patent: Oct. 22, 2019

(54) CONVEYANCE SEAT

(71) Applicant: TOYOTA BOSHOKU KABUSHIKI KAISHA, Aichi (JP)

(72) Inventors: Koji Takiya, Aichi (JP); Masato Kuroda, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 54 days.

(21) Appl. No.: 15/877,852

(22) Filed: Jan. 23, 2018

(65) Prior Publication Data

US 2018/0257517 A1    Sep. 13, 2018

(30) Foreign Application Priority Data

Mar. 8, 2017   (JP) .................. 2017-043943

(51) Int. Cl.
*B60N 2/22* (2006.01)
*B60N 2/20* (2006.01)
*B60N 2/235* (2006.01)

(52) U.S. Cl.
CPC ............. *B60N 2/2227* (2013.01); *B60N 2/20* (2013.01); *B60N 2/2356* (2013.01)

(58) Field of Classification Search
CPC ........ B60N 2/206; B60N 2/20; B60N 2/2227; B60N 2/2356
USPC .......................... 297/378.12, 367 R
See application file for complete search history.

(56) References Cited

U.S. PATENT DOCUMENTS

| | | | | |
|---|---|---|---|---|
| 6,139,104 | A * | 10/2000 | Brewer | B60N 2/20 297/341 |
| 6,290,297 | B1 * | 9/2001 | Yu | B60N 2/01583 297/378.12 |
| 7,364,237 | B2 * | 4/2008 | Grable | B60N 2/20 297/367 R |
| 7,490,907 | B2 | 2/2009 | Nagura et al. | |
| 2005/0248200 | A1 * | 11/2005 | Pradier | B60N 2/20 297/378.1 |
| 2007/0040437 | A1 | 2/2007 | Nagura et al. | |
| 2007/0138854 | A1 * | 6/2007 | Paing | B60N 2/20 297/378.12 |

FOREIGN PATENT DOCUMENTS

JP    2007-037888    2/2007

* cited by examiner

*Primary Examiner* — Milton Nelson, Jr.
(74) *Attorney, Agent, or Firm* — Greenblum & Bernstein, P.L.C.

(57) ABSTRACT

A conveyance seat that can increase an engagement force in a walk-in mechanism is provided. One mode of the present disclosure is a conveyance seat comprising a back frame; a tilting member; an engagement member; and a locking member. The tilting member transmits a pivoting force to the back frame and is pivotable relative to the back frame. The engagement member is displaceable between an engaged position and a non-engaged position relative to the tilting member. The locking member is displaceable between a locked position and an unlocked position relative to the engagement member. The engagement member comprises a first engagement portion and a second engagement portion that are offset from each other along the pivot axis of the back frame. The tilting member comprises a first receiving member engageable with the first engagement portion, and a second receiving member engageable with the second engagement portion.

6 Claims, 6 Drawing Sheets

CONVEYANCE SEAT

CROSS-REFERENCE TO RELATED APPLICATIONS

This application claims the benefit of Japanese Patent Application No. 2017-043943 filed Mar. 8, 2017 in the Japan Patent Office, the entire disclosure of which is incorporated herein by reference.

BACKGROUND

The present disclosure relates to a conveyance seat.

A conveyance seat for conveyances such as vehicles comprises a reclining device to pivot the seatback relative to the seat cushion. In addition, a conveyance seat for, for example, a passenger seat in a passenger car and the second row in a three-row seater car comprises a walk-in mechanism that allows access to the rear side of the seatback by folding the seatback down.

This walk-in mechanism releases engagement between an engagement member (so-called pawl) and a tilting member (so-called ratchet plate) to fold the seatback down further than a seatback-tilt by a reclining function (Japanese Unexamined Patent Application Publication 2007-037888).

SUMMARY

In the aforementioned walk-in mechanism, a weak engagement force between the pawl and the ratchet plate results in insufficient strength of the conveyance seat in a seat-mode; and therefore, an increase in engagement force is required.

One possible method to increase the engagement force is to add a reinforcing component to the walk-in mechanism. However, such addition of a new component increases cost and mass of the conveyance seat.

A preferred aspect of the present disclosure is a conveyance seat that increases the engagement force between the components in a walk-in mechanism with a small number of components.

One aspect of the present disclosure is a conveyance seat that comprises a seat cushion, and a seatback. The seatback is pivotable frontward and rearward relative to the seat cushion. The conveyance seat also comprises a cushion frame that is a frame of the seat cushion; a back frame that is a frame of the seatback; a tilting member having a plate-like shape; an engagement member having a plate-like shape; and a locking member having a plate-like shape. The back frame is coupled to the cushion frame to be pivotable frontward and rearward relative to the cushion frame. The tilting member transmits a pivoting force, to the back frame, for pivoting the back frame and is pivotable relative to the back frame about a pivot axis of the back frame. The engagement member is coupled to the back frame and is displaceable between an engaged position, where the engagement member is engaged with the tilting member, and a non-engaged position, where the engagement of the engagement member with the tilting member is released. The locking member is displaceable between a locked position, where the engagement member is locked in the engaged position, and an unlocked position, where the engagement member is not locked in the engaged position. The engagement member comprises a first engagement portion and a second engagement portion that are offset from each other along the pivot axis of the back frame. The tilting member comprises a first receiving member that is engageable with the first engagement portion, and a second receiving member that is engageable with the second engagement portion.

This configuration enables an increase in engagement points by engaging the engagement member with the tilting member at two points, namely the first engagement portion and the second engagement portion. Accordingly, the number of components can be reduced at the same time as enhancing the engagement force between the engagement member and the tilting member.

In one aspect of the present disclosure, the first receiving member may be situated farther from a pivot axis of the tilting member than the second receiving member is. In addition, the tilting member may be a single sheet material whose area where the first receiving member is formed is pressed along a thickness. According to this configuration, the tilting member that comprises the first receiving member and the second receiving member can be easily obtained from a single sheet material.

In one aspect of the present disclosure, a thickness of the first engagement portion and a thickness of the second engagement portion may be different from each other in the engagement member. According to this configuration, the thicknesses of the engagement member and the tilting member can each be optimized, which can reduce the space and the mass of the walk-in mechanism while enhancing the engagement force.

In one aspect of the present disclosure, the first engagement portion and the second engagement portion may be configured to be collectively displaced. Since the first engagement portion and the second engagement portion simultaneously engage with the tilting member, this configuration helps to reduce differences in the degree of engagement, and consequently, can increase reliability of the walk-in mechanism.

In one aspect of the present disclosure, the first engagement portion and the second engagement portion each may have a plate-like shape. The locking member may be configured to abut only the first engagement portion in a pivoting direction of the locking member when the locking member is placed in the locked position. This configuration allows a reduction in the thickness of the locking member, and consequently allows a reduction in the mass of the walk-in mechanism.

In one aspect of the present disclosure, an area of the second engagement portion may be greater than an area of the first engagement portion in a planar view. This configuration can increase the joining strength between the first engagement portion and the second engagement portion, and consequently, increase the reliability of the walk-in mechanism.

BRIEF DESCRIPTION OF THE DRAWINGS

Embodiments of the present disclosure will be described hereinafter by way of example with reference to the accompanying drawings, in which.

DETAILED DESCRIPTION OF THE PREFERRED EMBODIMENTS

1. First Embodiment

[1-1. Configuration]

Figure 1:
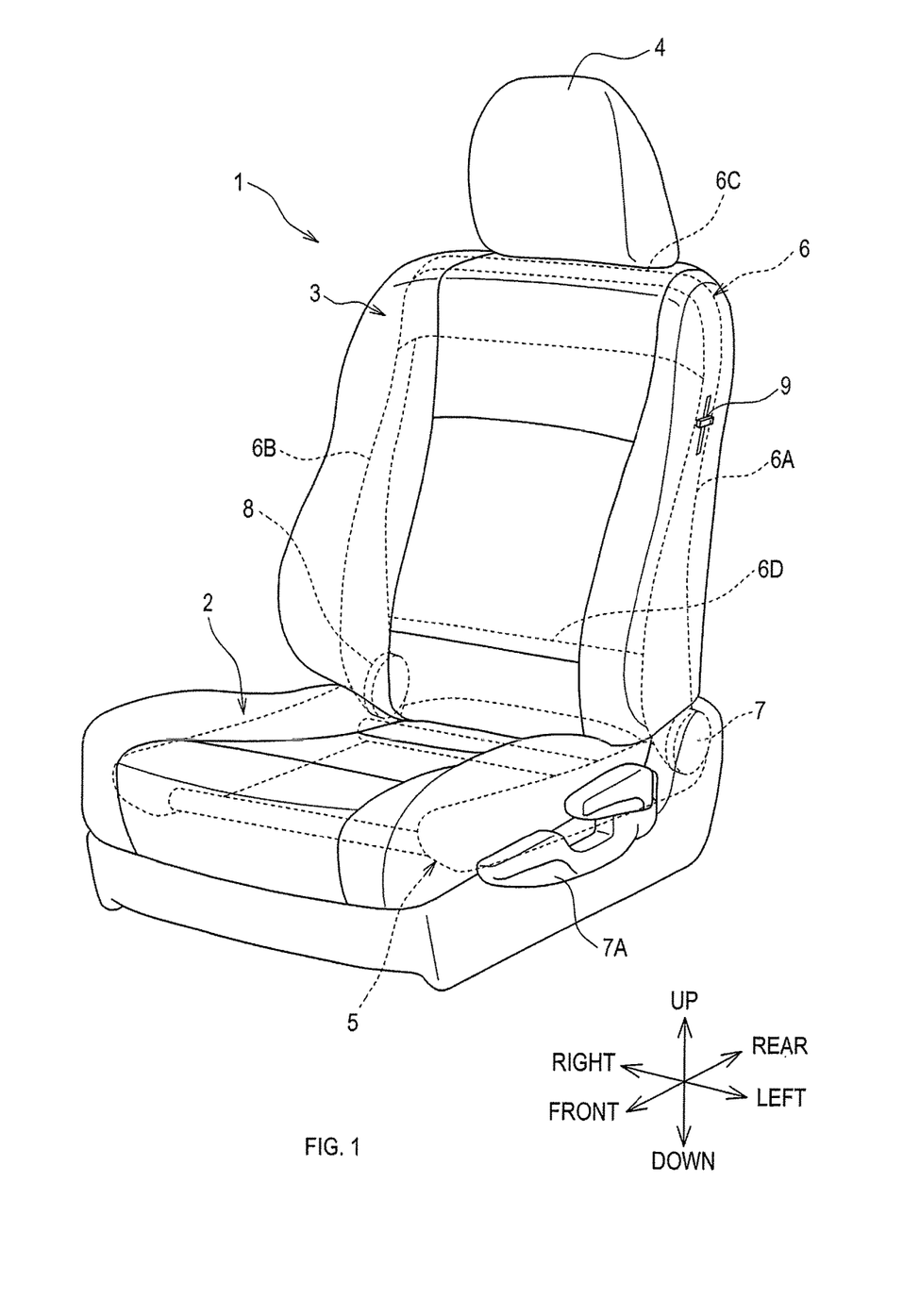
FIG. 1 is a schematic perspective view of a conveyance seat according to an embodiment.

A conveyance seat 1 shown in FIG. 1 comprises a seat cushion 2, a seatback 3, and a headrest 4.

The seat cushion 2 is for supporting the buttocks of an occupant. The seatback 3 is for supporting the back of the occupant and is pivotable frontward and rearward relative to the seat cushion 2. The headrest 4 is for supporting the head of the occupant.

The conveyance seat 1 also comprises a cushion frame 5 that is a frame of the seat cushion 2, and a back frame 6 that is a frame of the seatback 3. The back frame 6 is coupled to the cushion frame 5 and is configured to be pivotable frontward and rearward relative to the cushion frame 5.

Figure 2:
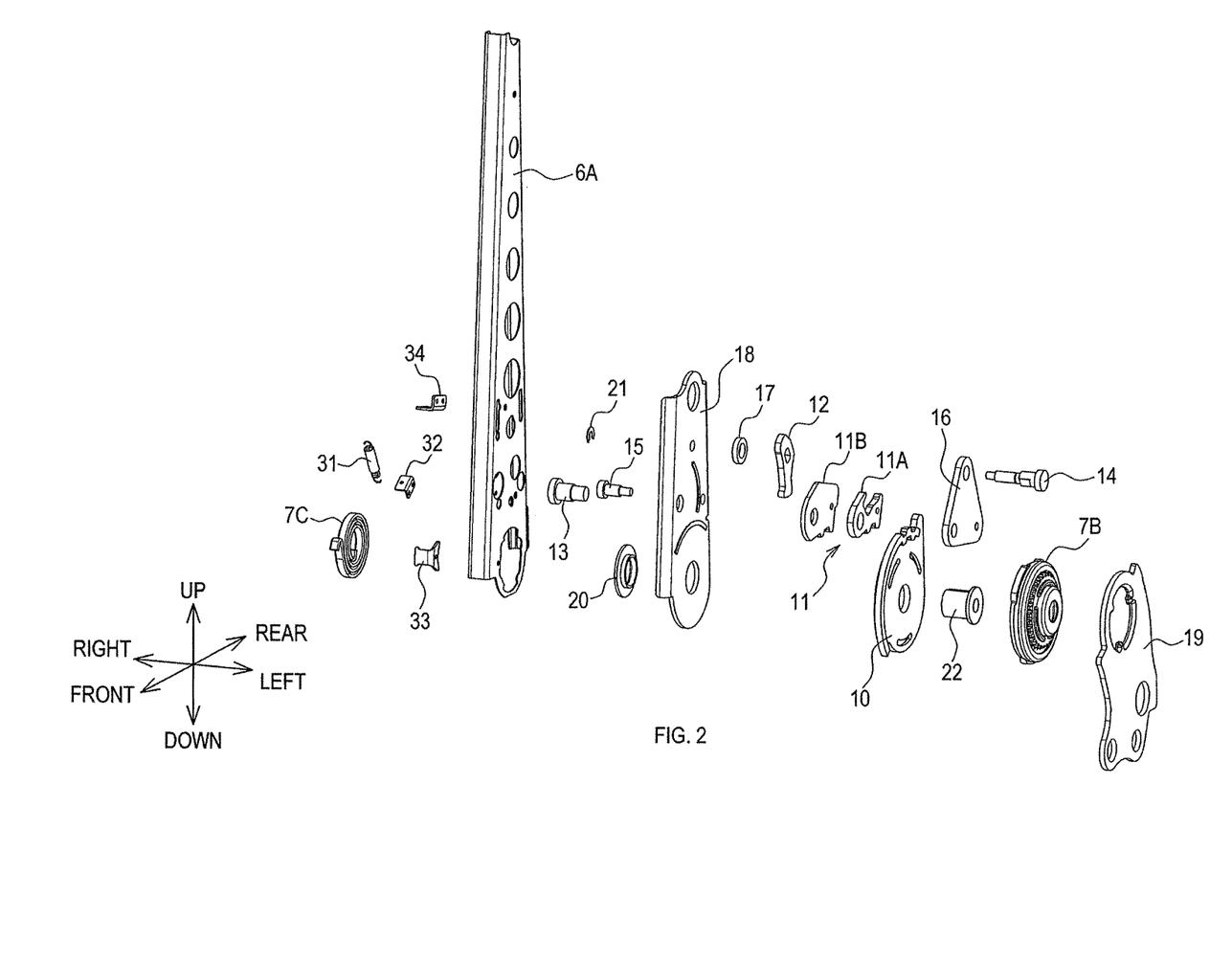
FIG. 2 is a schematic exploded perspective view of a recliner and a walk-in mechanism in the conveyance seat of FIG. 1.

The conveyance seat 1 further comprises two recliners 7 and 8 (left recliner 7 and right recliner 8) disposed along the width axis of the conveyance seat 1 as shown in FIG. 1, and a walk-in mechanism that comprises a tilting member 10, an engagement member 11, a locking member 12, and other components as shown in FIG. 2.

The conveyance seat 1 in the present embodiment is used as, for example, a passenger seat of a passenger car and a rear seat for the second row in a three-row seater car. In the explanations and references to the drawings hereinafter, directions are defined in relation to the conveyance seat 1 that is assembled to a conveyance (vehicle).

<Back Frame>

As shown in FIG. 1, the back frame 6 comprises two side frames 6A and 6B (left side frame 6A and right side frame 6B), an upper panel 6C, and a lower panel 6D.

The two side frames 6A and 6B each extend vertically and are disposed separately along the width axis of the seat (seat-width axis). In the present embodiment, the seat-width axis corresponds to the left-right axis of the vehicle.

The recliners 7 and 8 are disposed in the lower side of the two side frames 6A and 6B respectively. The two recliners 7 and 8 each comprise a reclining function that controls pivoting movement of the seatback 3, in other words, of the back frame 6. In addition to the recliner 7, the walk-in mechanism shown in FIG. 2 is also attached to the lower side of the left side frame 6A.

The upper panel 6C extends along the seat-width axis and couples the upper ends of the two side frames 6A and 6B. The upper panel 6C is a panel-shaped frame that has, for example, a substantially C-shaped cross section taken perpendicular to the extending direction of the upper panel 6C.

The lower panel 6D extends along the seat-width axis and couples the lower ends of the two side frames 6A and 6B. The lower panel 6D is a panel-shaped member that has, for example, a substantially C-shaped or J-shaped cross section taken perpendicular to the extending direction of the lower panel 6D.

<Recliner>

The two recliners 7 and 8 each comprise a locking mechanism 7B, a pivoting force generation mechanism 7C, and other components as shown in FIG. 2. The locking mechanism 7B shifts between a locked state, in which the pivoting movement of the back frame 6 is inhibited, and a released state, in which the locked state is released.

The pivoting force generation mechanism 7C is for generating a pivoting force to cause the back frame 6 to pivot at least in the released state. An electric motor and a spiral torsion spring are examples of the pivoting force generation mechanism 7C.

In the two recliners 7 and 8, the locking mechanism 7B functions when a reclining lever 7A, which is attached to a side face of the seat cushion 2, is manipulated. For example, if the pivoting force generation mechanism 7C is a spiral torsion spring, the back frame 6 tends to tilt forward (to a folded down position) due to a pivoting force generated by the pivoting force generation mechanism 7C when the locking mechanism 7B is placed in the released state. However, if the occupant pushes the seatback 3 rearward against the pivoting force (from the folded down position), the back frame 6 and the seatback 3 are caused to pivot rearward. Meanwhile, if the pivoting force generation mechanism 7C is an electric motor, the electric motor starts rotating at the same time as the locking mechanism 7B is placed in the released state and causes the seatback 3 to pivot forward or rearward.

<Walk-in Mechanism>

As shown in FIG. 2, the walk-in mechanism comprises the tilting member 10, the engagement member 11, and the locking member 12.

(Tilting Member)

The tilting member 10 has a plate-like shape and is for transmitting the pivoting force generated in the pivoting force generation mechanism 7C of the recliner 7 to the back frame 6. The tilting member 10 is also referred to as a ratchet plate or a rotating cam.

Figure 3:
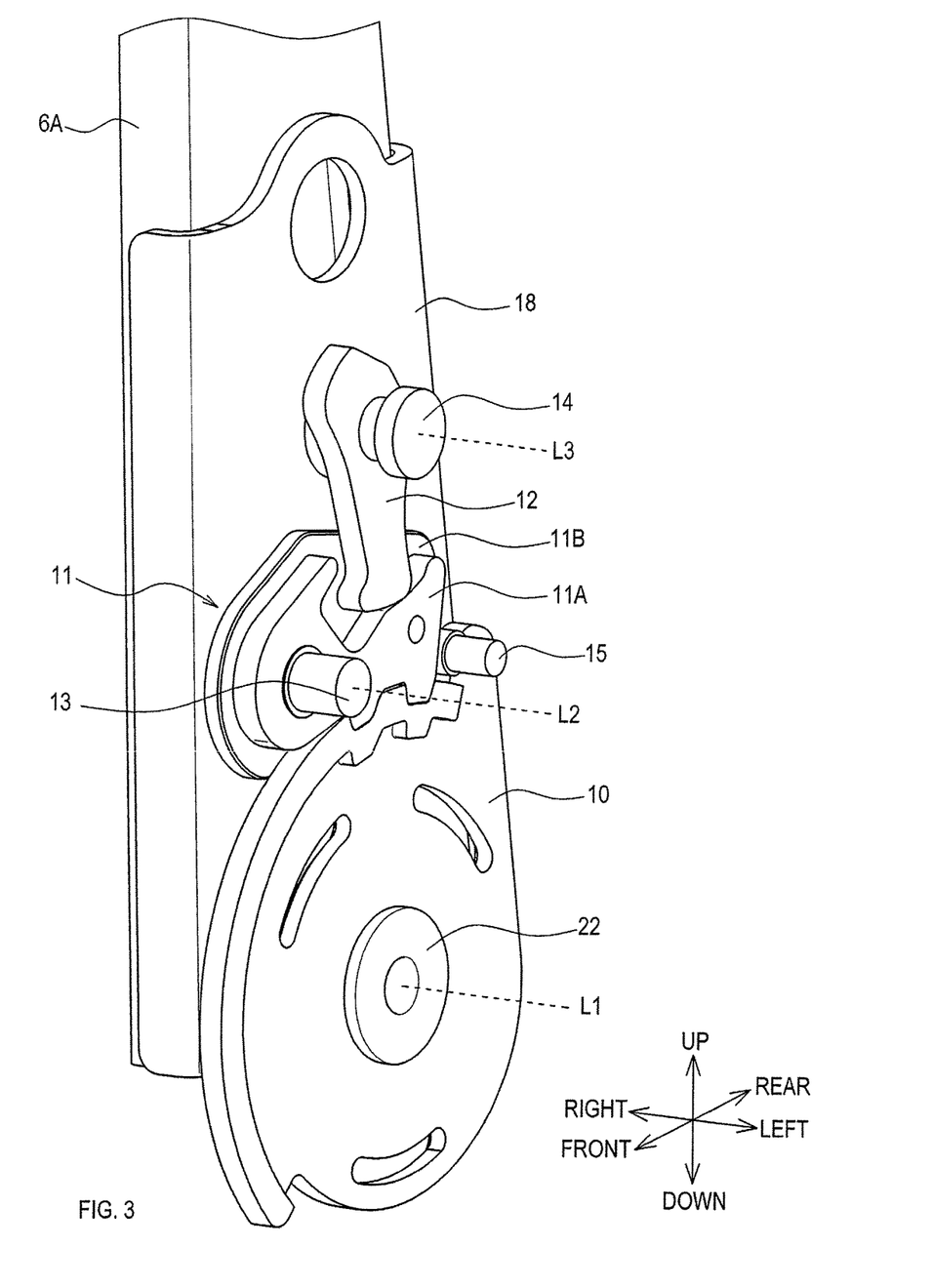
FIG. 3 is a schematic perspective view showing a positional relationship between a tilting member, an engagement member, and a locking member in the conveyance seat of FIG. 1.

As shown in FIG. 3, the tilting member 10 is configured to be pivotable relative to the back frame 6 about a pivot axis L1 of the back frame 6. In other words, the pivot axis of the tilting member 10 coincides with the pivot axis L1 of the back frame 6. The tilting member 10 is coupled to the pivoting force generation mechanism 7C of the recliner 7 to transmit a pivoting force.

Figure 4:
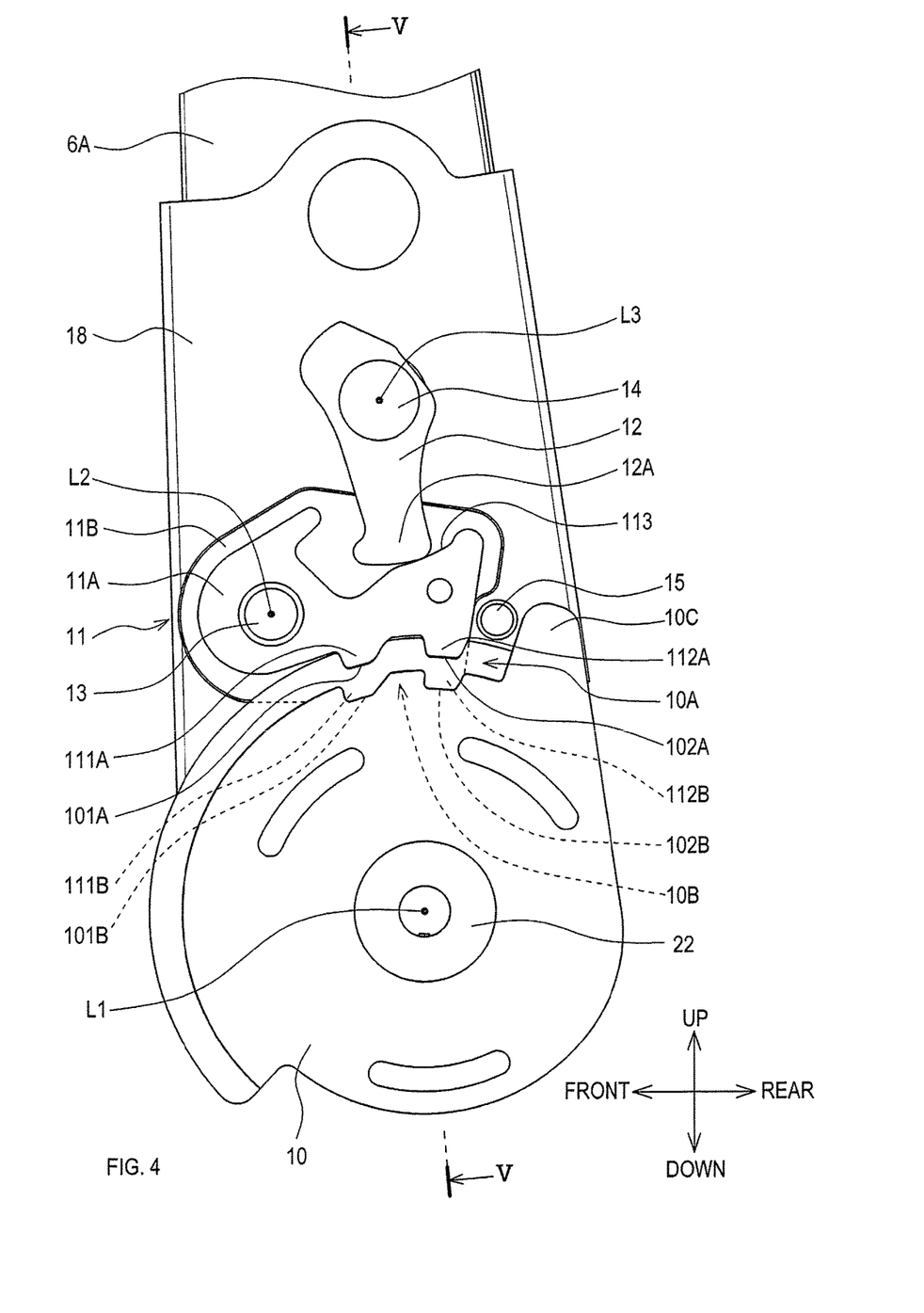
FIG. 4 is a schematic left side view showing the positional relationship between the tilting member, the engagement member, and the locking member in the conveyance seat of FIG. 1.
Figure 6:
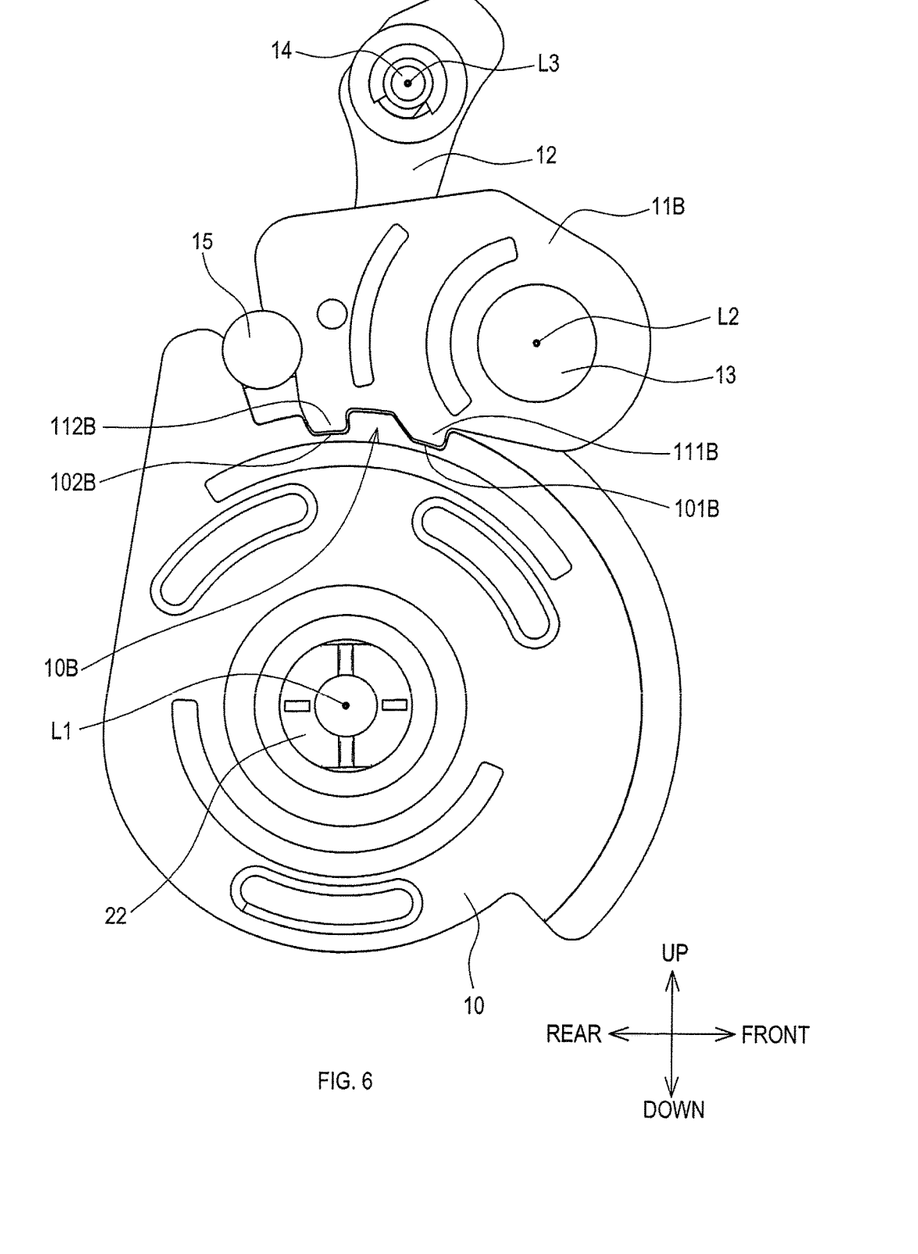
FIG. 6 is a schematic right side view showing the positional relationship between the tilting member, the engagement member, and the locking member in the conveyance seat of FIG. 1.

More specifically, as shown in FIG. 3, FIG. 4, and FIG. 6, the tilting member 10 has a substantially disk-like shape and comprises, in its central area, a through hole with a pivot axis L1. A bushing nut 22 that is configured to be coupled to the locking mechanism 7B and other components are inserted in this through hole.

In a seat-mode, in which the conveyance seat 1 is not folded down, the tilting member 10 comprises, in its upper end, a first receiving member 10A and a second receiving member 10B with which engagement portions of the engagement member 11 are engageable. The engagement portions will be explained later. The tilting member 10 also comprises, on the rear side of its upper end (in other words, on the side of its upper end opposite the tilting direction of the back frame 6), a tongue-shaped portion 10C that extends upwardly and abuts a stopper pin 15.

The first receiving member 10A comprises depressions 101A and 102A with which a first engagement portion 11A of the engagement member 11 is engageable. The second receiving member 10B comprises depressions 101B and 102B with which a second engagement portion 11B of the engagement member 11 is engageable.

The first receiving member 10A and the second receiving member 10B are offset from each other along the pivot axis L1 of the back frame 6. Specifically, as shown in FIG. 5, the first receiving member 10A is situated more outwardly (in the present embodiment, closer to the left side) of the back frame 6 than the second receiving member 10B is.

In the present embodiment, as shown in FIG. 4, the first receiving member 10A is situated farther from the pivot axis L1 of the tilting member 10 than the second receiving member 10B is. In other words, the depressions 101B and 102B of the second receiving member 10B are situated closer to the pivot axis L1 of the tilting member 10, that is, more radially inwardly of the tilting member 10, than the depressions 101A and 102A of the first receiving member 10A are.

In the present embodiment, the first receiving member 10A and the second receiving member 10B are formed by half-blanking a single sheet material. More specifically, the second receiving member 10B is formed by half-blanking, along the thickness direction, the upper end of the tilting member 10, where the first receiving member 10A is formed, for a constant distance from the outer edge of the tilting member 10. The tilting member 10 is thus formed from a single sheet material whose area where the first receiving member 10A is formed is pressed along the thickness.

Figure 5:
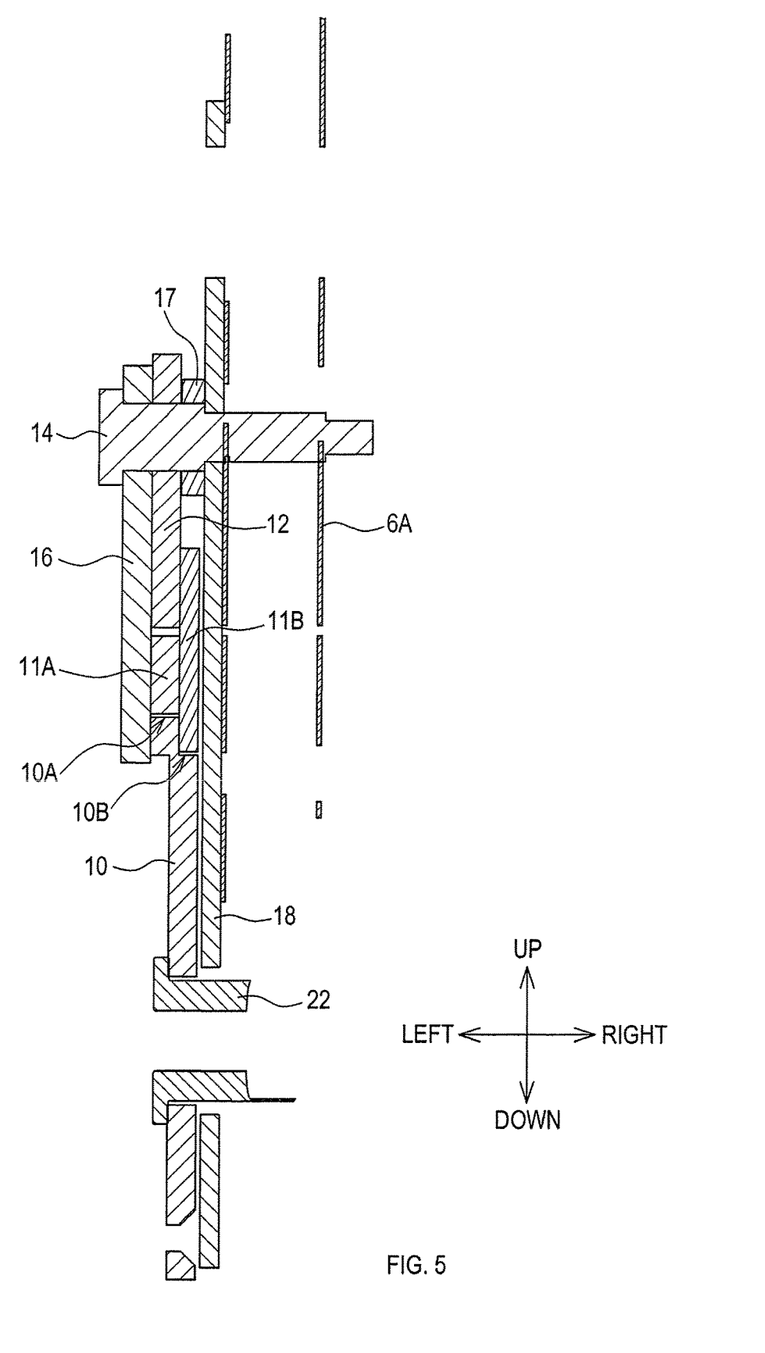
FIG. 5 is a schematic sectional view taken along line V-V of FIG. 4.

Since the first receiving member 10A and the second receiving member 10B are formed by half-blanking a sheet material, the thickness of the second receiving member 10B is less than the thickness of the first receiving member 10A as shown in FIG. 5. This is for the reason that, while the thickness of the first receiving member 10A is equal to the thickness of the original sheet material, which is the thickness before the half-blanking, the thickness of the second receiving member 10B is thinner than the thickness of the original sheet material for the thickness of the connected part sharing with the first receiving member 10A. Thus, the second engagement portion 11B (to engage with the second receiving member 10B) is thinner than the first engagement portion 11A.

The tongue-shaped portion 10C restricts the rearward pivoting movement of the back frame 6 by abutting the stopper pin 15, which is fixed to the side frame 6A and comes into contact from the front, when the engagement member 11 is placed in a non-engaged position and disengaged with the tilting member 10. When the engagement member 11 is placed in an engaged position and engaged with the tilting member 10, the stopper pin 15 is situated between the engagement member 11 and the tongue-shaped portion 10C and spaced apart from the tongue-shaped portion 10C.

(Engagement Member)

As shown in the drawings, for example, FIG. 2 and FIG. 3, the engagement member 11 has a plate-like shape and comprises the first engagement portion 11A, and the second engagement portion 11B. The engagement member 11 is also referred to as a pawl.

The engagement member 11 is coupled to the side frame 6A (in other words, to the back frame 6) with a coupling pin 13 (with pivot axis L2) and displaceable between the engaged position, where the engagement member 11 is engaged with the tilting member 10, and the non-engaged position, where the engagement of the engagement member 11 with the tilting member 10 is released.

The engagement member 11 is arranged so that it overlaps, in its thickness direction, with the tilting member 10 and also arranged so that the plate surfaces of the engagement member 11 and the tilting member 10 are parallel to each other. The engagement member 11 is configured to be pivotable about a pivot axis L2, which is the central axis of the coupling pin 13. The pivot axis L2 of the engagement member 11 is parallel to the pivot axis L1 of the back frame 6. The engagement member 11 is retained in the non-engaged position by an elastic force from an elastic element and displaced to the engaged position by displacement of the locking member 12, which will be explained later.

As shown in FIG. 5, the engagement member 11 comprises the first engagement portion 11A and the second engagement portion 11B that are offset from each other along the pivot axis L2 (in other words, along the thickness, or left-right direction).

As shown in FIG. 4, the first engagement portion 11A comprises a first projection 111A that is engageable with a first depression 101A of the first receiving member 10A, and a second projection 112A that is engageable with a second depression 102A of the first receiving member 10A. In addition, as shown in FIG. 6, the second engagement portion 11B comprises a third projection 111B that is engageable with a third depression 101B of the second receiving member 10B, and a fourth projection 112B that is engageable with a fourth depression 102B of the second receiving member 10B.

In the present embodiment, the first engagement portion 11A and the second engagement portion 11B both have a plate-like shape. Since surfaces of the first engagement portion 11A and the second engagement portion 11B are joined by, for example, welding, the first engagement portion 11A and the second engagement portion 11B are displaced collectively. In addition, the first engagement portion 11A and the second engagement portion 11B pivot about their common pivot axis L2.

Each of the first engagement portion 11A and the second engagement portion 11B comprises projections in one end, which is the lower end when these engagement portions 11A and 11B are placed in the engaged position relative to the tilting member 10. The first engagement portion 11A and the second engagement portion 11B are displaced to be in the non-engaged position, where the engagement of the engagement member 11 with the tilting member 10 is released, by pivoting about the pivot axis L2 so that the projections are moved upward and situated away from the tilting member 10.

As shown in FIG. 5, the thickness of the first engagement portion 11A is the same as the thickness of the first receiving member 10A. Likewise, the thickness of the second engagement portion 11B is the same as the thickness of the second receiving member 10B. Accordingly, the thickness of the first engagement portion 11A is greater than the thickness of the second engagement portion 11B.

As shown in the drawings, for example, FIG. 3 and FIG. 4, the area of the second engagement portion 11B is greater than the area of the first engagement portion 11A in the planar view and side views. Specifically, as viewed along the pivot axis L2, the outer edge of the second engagement portion 11B is situated more externally than the outer edge of the first engagement portion 11A. In the engagement member 11, the projections 111B and 112B of the second engagement portion 11B are therefore situated closer to the tilting member 10 than the projections 111A and 112A of the first engagement portion 11A are.

As shown in FIG. 4, the first engagement portion 11A comprises, on the opposite side of where the projections 111A and 112A are disposed, a sliding contact portion 113 that has an inwardly curved contour and engages with the locking member 12. The inward curve of the sliding contact portion 113 becomes deeper towards the pivot axis L2. Meanwhile, the second engagement portion 11B does not comprise such a sliding contact portion; the edge of the second engagement portion 11B on the opposite side of the projections 111B and 112B is smooth.

(Locking Member)

The locking member 12 has a plate-like shape and is configured for locking the engagement member 11 in the engaged position. The locking member 12 is coupled to the side frame 6A (in other words, to the back frame 6) with a coupling pin 14 and displaceable between a locked position, where the engagement member 11 is locked, and an unlocked position, where the engagement member 11 is not locked. The locking member 12 has a substantially belt-like, flat, and rectangular shape with rounded corners. The coupling pin 14 is inserted in the first end of the locking member 12, and a cam 12A is formed in the second end of the locking member 12.

As shown in FIG. 5, the locking member 12 is arranged to overlap, in its thickness direction, with the tilting member 10 and the first engagement portion 11A of the engagement member 11 (but not the second engagement portion 11B), and is also arranged so that the plate surface of the locking member 12 is parallel to the plate surfaces of the tilting member 10 and the engagement member 11. The left surface of locking member 12 is coplanar with the left surface of first engagement portion 11A and coplanar with the left surface of first receiving member 10A, the right surface of locking member 12 is coplanar with the right surface of first engagement portion 11A and with the right surface of first receiving member 10A. The locking member 12 is configured to be pivotable about a pivot axis L3, which is the central axis of the coupling pin 14. The locking member 12 is retained in the locked position by an elastic force from an elastic element and displaced to the unlocked position by wire manipulation.

In the seat-mode as shown in the drawings, for example, FIG. 4, the locking member 12 is placed in the locked position and is arranged so that the longitudinal axis of the locking member 12 substantially coincides with the vertical axis. In this seat-mode, the cam 12A restricts the pivoting movement of the engagement member 11 by abutting a shallow curved area of the sliding contact portion 113 of the first engagement portion 11A (that is, the rear area of the sliding contact portion 113). When the cam 12A reaches, by sliding, to a deep curved area of the sliding contact portion 113 (that is, the front area of the sliding contact portion 113) in response to pivoting of the locking member 12, the engagement member 11 is released from the lock by the cam 12A and is enabled to pivot.

In the present embodiment, as shown in FIG. 4 and FIG. 5, the locking member 12 abuts, in its pivoting direction, only the sliding contact portion 113 of the first engagement portion 11A when the locking member 12 is placed in the locked position. The locking member 12 does not abut or contact, in its pivoting direction, an upper surface of the second engagement portion 11B when the locking member 12 is placed in the locked position. However, the locking member 12 may abut, in its thickness direction, the left side vertical surface of the second engagement portion 11B.

(Other Configurations)

As shown in FIG. 2, the conveyance seat 1 comprises a restricting member 16; a collar 17; a first plate 18; a second plate 19; a bushing 20; an E-ring 21; a spring 31; a spring-bracket 32; a spiral-bracket 33; and a wire-bracket 34, as the components configuring the walk-in mechanism.

The restricting member 16 is combined with the collar 17 and coupled to the side frame 6A with the coupling pin 14. The restricting member 16 is a cover member that has a plate-like shape and covers the locking member 12 and the engagement member 11. Displacement of the locking member 12 and the engagement member 11 along the seat-width axis is restricted by the restricting member 16.

The spring 31 is disposed via the spring-bracket 32 in the opposite side of the locking member 12 across the side frame 6A. The spring 31 exerts an elastic force to retain the locking member 12 in the locked position. Specifically, the spring 31 has its one end fixed to an arm (not shown) that is configured to be coupled to the locking member 12. One end of the arm is coupled to one end of a wire such as a control cable. This wire is coupled to a walk-in lever 9, which is shown in FIG. 1, via the wire-bracket 34.

[1-2. Movement of Walk-In Mechanism]

Hereinafter, movement of the walk-in mechanism in the conveyance seat 1 will be explained.

First, a shift from the seat-mode to a walk-in-mode (also known as a folding-down-mode) is as described below.

As shown in FIG. 3 and FIG. 4, the locking member 12 is placed in the locked position, and the engagement member 11 is placed in the engaged position in the seat-mode. In this seat-mode, a pivoting force generated in the pivoting force generation mechanism 7C in the recliner 7 is transmitted to the back frame 6 via the tilting member 10 and the engagement member 11. The tilting member 10 and the back frame 6 therefore collectively pivot relative to the cushion frame 5.

When the walk-in lever 9 is manipulated in the seat-mode, the locking member 12 is caused to pivot by a tension of the wire and is displaced to the unlocked position; and concurrently, the engagement member 11 is caused to pivot by an elastic force from an elastic element to the non-engaged position. This displacement interrupts a transmitting path of the pivoting force from the pivoting force generation mechanism 7C to the back frame 6. In addition, since the side frame 6A is made pivotable relative to the tilting member 10, folding down of the seat is enabled notwithstanding that the locking mechanism 7B in each of the recliners 7 and 8 is placed in the locked state. By tilting the back frame 6 and the seatback 3 forward in this state, the mode is shifted to the walk-in-mode.

Next, the mode is shifted from the walk-in-mode to the seat-mode by pivoting and raising the back frame 6 and the seatback 3. By raising the back frame 6, the engagement member 11 is caused to slide along the outer circumference of the tilting member 10 and displaced to the engaged position; and concurrently, the locking member 12 is displaced to the locked position.

[1-3. Effect]

According to the embodiment described above, the following effects can be obtained.

(1a) One tilting member 10 can comprise two receiving members, namely the first receiving member 10A and the second receiving member 10B, and engage with two engagement portions of the engagement member 11, namely the first engagement portion 11A and the second engagement portion 11B. This can reduce the number of components at the same time as enhancing the engagement force between the engagement member 11 and the tilting member 10.

In addition, the first engagement portion 11A and the second engagement portion 11B are offset from each other along the pivot axis. This offset arrangement makes the distance between the most distant two projections shorter than an arrangement that has a plurality of projections aligned at the same location along the pivot axis. Consequently, precision of engagement can be enhanced.

(1b) The thicknesses of the engagement member 11 and the tilting member 10 can be optimized since the thicknesses of the first engagement portion 11A and the second engagement portion 11B are different from each other. This can help to reduce the space and the mass of the walk-in mechanism while enhancing the engagement force.

(1c) The tilting member 10 that comprises the first receiving member 10A and the second receiving member 10B can be easily obtained by half-blanking a single sheet material. Also, the thickness of the tilting member 10 can be reduced to the minimum, while the upper surface available for receiving a lower surface of the engagement member is almost double the thickness of the single sheet material.

(1d) The first engagement portion 11A and the second engagement portion 11B are collectively displaced and simultaneously engaged with the tilting member 10. This can reduce differences in the degree of engagement, and thus can increase reliability of the walk-in mechanism.

(1e) The locking member 12 abuts, in its pivoting direction, only the first engagement portion 11A when the locking member 12 is placed in the locked position. This enables a reduction in the thickness of the locking member 12, and consequently, a reduction in the mass of the walk-in mechanism.

(1f) The area of the second engagement portion 11B is greater than the area of the first engagement portion 11A in the planar view. This can increase the joining strength between the first engagement portion 11A and the second engagement portion 11B, and consequently increase the reliability of the walk-in mechanism. Further, the second engagement portion 11B helps to sandwich (from the right side) the first receiving member 10A with assistance from the restricting member 16 (from the left side)

2. Other Embodiments

Although the embodiment of the present disclosure has been described hereinbefore, the present disclosure may nevertheless be modified to various forms without being limited to the aforementioned embodiment.

(2a) In the conveyance seat 1 in the aforementioned embodiment, the first engagement portion 11A and the second engagement portion 11B are not always required to be displaced collectively. In other words, the first engagement portion 11A and the second engagement portion 11B do not have to be joined and may be configured to be individually pivotable. Alternatively, the first engagement portion 11A and the second engagement portion 11B may be integrally formed by, for example, casting and cutting.

In the conveyance seat 1 in the aforementioned embodiment, the thickness of the second engagement portion 11B may be greater than the thickness of the first engagement portion 11A. Alternatively, the thickness of the first engagement portion 11A may be the same as the thickness of the second engagement portion 11B. In addition, the area of the first engagement portion 11A may be equal to or greater than the area of the second engagement portion 11B in the planar view.

(2c) In the conveyance seat 1 in the aforementioned embodiment, the first receiving member 10A may be situated closer to the pivot axis L1 of the tilting member 10 than the second receiving member 10B is. In addition, the first receiving member 10A and the second receiving member 10B may be situated at the same distance from the pivot axis L1.

The first receiving member 10A and/or the second receiving member 10B of the tilting member 10 may be formed by a method other than press working. In addition, the tilting member 10 is not always required to be formed from a single sheet material; it may be made from two or more materials.

(2d) In the conveyance seat 1 in the aforementioned embodiment, the locking member 12 may abut both the first engagement portion 11A and the second engagement portion 11B in the pivoting direction of the locking member 12. Alternatively, the locking member 12 may abut only the second engagement portion 11B.

(2e) In the conveyance seat 1 in the aforementioned embodiment, the tilting member 10 may comprise another receiving member in addition to the first receiving member 10A and the second receiving member 10B. Also, the engagement member 11 may comprise another engagement portion in addition to the first engagement portion 11A and the second engagement portion 11B. In addition, the number of depressions in each of the receiving members and the number of projections in each of the engagement portions may be more or less than two (contrary to FIG. 4). The number of depressions and projections may be three or more each.

(2f) The conveyance seat 1 in the aforementioned embodiment may be utilized as a passenger seat of a passenger car, a seat other than a rear seat for an automobile, or a seat for conveyances other than automobiles such as railway vehicles, vessels, and aircrafts.

(2g) Functions of one element in the aforementioned embodiment may be divided for two or more elements, or functions of two or more elements in the aforementioned embodiment may be incorporated into one element. A part of the configuration of the aforementioned embodiment may be omitted; and at least a part of the configurations of the aforementioned embodiment may be added to or replaced with another configuration of the aforementioned embodiment. It should be noted that any and all modes that are encompassed in the technical ideas defined by the languages in the scope of the claims are embodiments of the present disclosure.

What is claimed is:

1. A conveyance seat comprising:
   a seat cushion;
   a seatback that is pivotable frontward and rearward relative to the seat cushion;
   a cushion frame that is a frame of the seat cushion;
   a back frame that is a frame of the seatback and is coupled to the cushion frame to be pivotable frontward and rearward relative to the cushion frame;
   a tilting member having a plate shape that transmits, to the back frame, a pivoting force for pivoting the back frame and is pivotable relative to the back frame about a pivot axis of the back frame;
   an engagement member having a plate shape that is coupled to the back frame and displaceable between an engaged position, where the engagement member is engaged with the tilting member, and a non-engaged position, where the engagement of the engagement member with the tilting member is released; and
   a locking member having a plate shape that is displaceable between a locked position, where the engagement member is locked in the engaged position, and an unlocked position, where the engagement member is not locked in the engaged position, the engagement member comprising a first engagement portion and a second engagement portion that are offset from each other along the pivot axis of the back frame, and the tilting member comprising a first receiving member that is engageable with the first engagement portion, and a second receiving member that is engageable with the second engagement portion.

2. The conveyance seat according to claim 1, wherein the first receiving member is situated farther from a pivot axis of the tilting member than the second receiving member is, and the tilting member is a single sheet material whose area where the first receiving member is formed is pressed along a thickness.

3. The conveyance seat according to claim 2, wherein a thickness of the first engagement portion and a thickness of the second engagement portion are different from each other in the engagement member.

4. The conveyance seat according to claim 1, wherein the first engagement portion and the second engagement portion are configured to be collectively displaced.

5. The conveyance seat according to claim 4, wherein the first engagement portion and the second engagement portion each have a plate shape, and the locking member is configured to abut only the first engagement portion in a pivoting direction of the locking member when the locking member is placed in the locked position.

6. The conveyance seat according to claim 5, wherein an area of the second engagement portion is greater than an area of the first engagement portion in a planar view.

\* \* \* \* \*